United States Patent
Zeigler et al.

(10) Patent No.: US 10,536,740 B2
(45) Date of Patent: Jan. 14, 2020

(54) ZONE SIGNAL TARGETING AND ANALYTICS

(71) Applicant: COX COMMUNICATIONS, INC., Atlanta, GA (US)

(72) Inventors: Michael R. Zeigler, Atlanta, GA (US); Brian Davis, Atlanta, GA (US); Monty Alan McCollum, Atlanta, GA (US); Dorothy N. Buie, Atlanta, GA (US); William F. Farina, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 14/280,029

(22) Filed: May 16, 2014

(65) Prior Publication Data

US 2015/0334433 A1 Nov. 19, 2015

(51) Int. Cl.
| | |
|---|---|
| *H04N 21/258* | (2011.01) |
| *H04N 21/2668* | (2011.01) |
| *H04N 21/234* | (2011.01) |
| *H04N 21/81* | (2011.01) |
| *H04N 21/235* | (2011.01) |
| *H04H 60/31* | (2008.01) |
| *H04H 60/42* | (2008.01) |
| *H04H 60/46* | (2008.01) |
| *H04H 60/65* | (2008.01) |
| *H04H 60/22* | (2008.01) |

(52) U.S. Cl.
CPC ........ *H04N 21/2668* (2013.01); *H04H 60/22* (2013.01); *H04H 60/31* (2013.01); *H04H 60/42* (2013.01); *H04H 60/46* (2013.01); *H04H 60/65* (2013.01); *H04N 21/2353* (2013.01); *H04N 21/23418* (2013.01); *H04N 21/258* (2013.01); *H04N 21/25841* (2013.01); *H04N 21/25891* (2013.01); *H04N 21/812* (2013.01)

(58) Field of Classification Search
CPC ......... H04N 21/25435; H04N 21/2668; H04N 21/258
USPC ...................................... 725/37–61, 74–104
See application file for complete search history.

(56) References Cited

U.S. PATENT DOCUMENTS

| | | | | |
|---|---|---|---|---|
| 5,424,770 A | * | 6/1995 | Schmelzer | H04N 7/165 348/705 |
| 5,563,892 A | * | 10/1996 | Kostreski | H04H 20/33 348/E5.003 |
| 8,239,888 B2 | * | 8/2012 | Todd | H04N 17/004 725/19 |
| 2002/0184649 A1 | * | 12/2002 | Wilson | H04N 21/235 725/114 |

(Continued)

*Primary Examiner* — Mushfikh I Alam
(74) *Attorney, Agent, or Firm* — Eversheds Sutherland (US) LLP

(57) ABSTRACT

Systems and methods for targeting advertisements to particular zones within a content distribution region are disclosed. One or more zone signals may be generated and distributed by combining media content with a respective advertisement corresponding to each of the zones within the distribution region. In some example cases, the media content may be received from a broadcaster. The systems and methods may further include the capability to determine zone based and/or advertisement based viewing metrics for one or more of the zones within the content distribution region by polling client devices within the one or more zones.

18 Claims, 8 Drawing Sheets

(56) References Cited

U.S. PATENT DOCUMENTS

| | | | |
|---|---|---|---|
| 2006/0195866 A1* | 8/2006 | Thukral | G06Q 30/02 725/34 |
| 2006/0287915 A1* | 12/2006 | Boulet | G06Q 30/02 705/14.61 |
| 2008/0306816 A1* | 12/2008 | Matthys | G06Q 30/02 705/14.69 |
| 2009/0044246 A1* | 2/2009 | Sheehan | H04N 21/2221 725/146 |
| 2009/0144797 A1* | 6/2009 | Wang | H04N 21/4331 725/131 |
| 2009/0150929 A1* | 6/2009 | Park | G06Q 30/0255 725/34 |
| 2009/0320063 A1* | 12/2009 | Barrett | H04N 21/23418 725/34 |
| 2010/0023958 A1* | 1/2010 | Bugenhagen | G06Q 30/02 725/1 |
| 2010/0031285 A1* | 2/2010 | Haberman | H04H 20/103 725/34 |
| 2010/0088717 A1* | 4/2010 | Candelore | H04N 21/234309 725/32 |
| 2010/0269128 A1* | 10/2010 | Gordon | H04N 7/17318 725/25 |
| 2011/0082744 A1* | 4/2011 | Iida | H04N 5/85 705/14.53 |
| 2011/0265116 A1* | 10/2011 | Stern | H04L 12/2801 725/35 |
| 2012/0243850 A1* | 9/2012 | Basra | H04N 5/76 386/248 |
| 2013/0014171 A1* | 1/2013 | Sansom | G06F 17/3082 725/52 |
| 2013/0024889 A1* | 1/2013 | Yan | H04L 12/1881 725/32 |
| 2013/0332955 A1* | 12/2013 | Hong | H04N 21/64784 725/34 |
| 2014/0020021 A1* | 1/2014 | Liu et al. | 725/39 |
| 2014/0036090 A1* | 2/2014 | Black | H04N 21/44016 348/159 |
| 2015/0106845 A1* | 4/2015 | Popkiewicz et al. | 725/34 |
| 2015/0150035 A1* | 5/2015 | Chizi | H04N 21/44204 725/14 |
| 2016/0007092 A1* | 1/2016 | Niemeijer | H04N 21/633 725/36 |
| 2016/0182970 A1* | 6/2016 | Sidi | G06F 15/16 725/35 |
| 2019/0141411 A1* | 5/2019 | Byers | G06Q 30/0251 |

* cited by examiner

ZONE SIGNAL TARGETING AND ANALYTICS

TECHNICAL FIELD

This disclosure generally relates to zone content signals, and more particularly to targeting and analytics of the zone content signals.

BACKGROUND

Media content is often distributed by content distributers, such as multiple-system operators (MSO) over particular geographic areas. The content distributers, to monetize the distribution of content, may insert advertisements into designated ad avails associated with the content being distributed by the content distributer. In some cases, the inserted ads may be political ads, particularly during periods just prior to elections. This content with the inserted ads may be distributed over the particular geographic area to which the content distributer provides a particular content.

BRIEF DESCRIPTION OF THE FIGURES

Reference will now be made to the accompanying drawings, which are not necessarily drawn to scale, and wherein.

DETAILED DESCRIPTION OF EMBODIMENTS OF THE INVENTION

Embodiments of the disclosure are described more fully hereinafter with reference to the accompanying drawings, in which example embodiments of the disclosure are shown. This disclosure may, however, be embodied in many different forms and should not be construed as limited to the example embodiments set forth herein; rather, these embodiments are provided so that this disclosure will be thorough and complete, and will fully convey the scope of the invention to those skilled in the art. Like numbers refer to like, but not necessarily the same or identical, elements throughout.

Example embodiments of the disclosure may provide systems, apparatus, non-transitory computer readable media, and methods for receiving media content, receiving one or more advertisements (ads), generating one or more zone content signals based at least in part on the received media content and the one or more ads, targeting the one or more generated zone content signals to corresponding spatial (e.g., geographic) zones, distributing the one or more generated zone content signals to its corresponding targeted spatial zones, receiving and/or compiling analytics and/or other information related to the distribution and the viewership of the one or more generated zone content signals, and distributing the analytics and/or other information related to the distribution of the one or more generated zone content signals.

Figure 1:
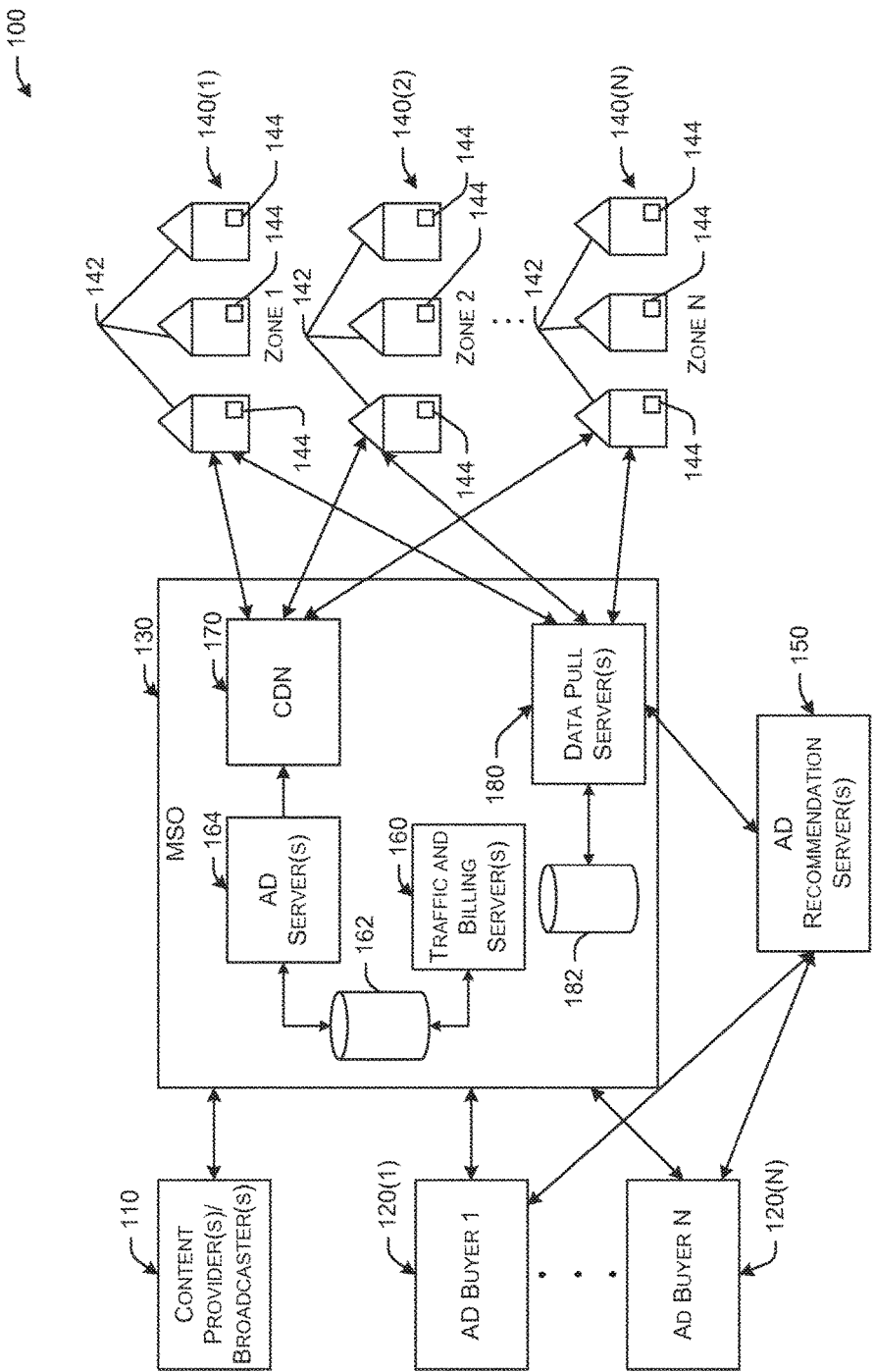
FIG. 1 is a simplified schematic diagram illustrating an environment where content signals and advertisements are received, zone content signals are generated and distributed, and analytics are provided, in accordance with certain example embodiments of the disclosure.

Example embodiments of the disclosure may understood in reference to FIG. 1. FIG. 1 is a simplified schematic diagram illustrating an environment 100 where content signals and advertisements are received, zone content signals are generated and distributed, and analytics are provided, in accordance with certain example embodiments of the disclosure. The environment 100 may include one or more content provider(s) and/or broadcaster(s) 110, one or more ad buyer(s) 120(1) . . . 120(N) (hereinafter referred to individually or collectively as ad buyer(s) 120), a multiple-system operator (MSO) 130, and one or more geographic and/or spatial zones 140(1), 140(2), 140(N) (hereinafter referred to individually or collectively as zone(s) 140).

The content provider(s) and/or broadcaster(s) 110 may be any suitable entity from which the MSO 130 may be configured to receive content, such as media content. In some cases, the content provider(s) and/or broadcaster(s) 110 may provide content through dedicated communicative links with the MSO 130, such as hard wired (e.g., coaxial cable) links, radio frequency (RF) (e.g., broadcast signal captured when aired) links, and/or satellite up/downlinks. In example embodiments, the MSO may be configured to receive content from the content provider(s) and/or broadcaster(s) 110 by more than one channel and/or band. In other words, the content provider(s) and/or broadcaster(s) 110 may be configured to provide the media content to the MSO 130 via any variety of channels, protocols, bands, and/or redundant mechanisms.

In some example embodiments, the content provider(s) and/or broadcaster(s) 110 may be a broadcaster 110 or over-the-air transmitter of media content signals (e.g., television broadcaster). In these cases, the broadcaster 110 may be configured to broadcast its media content over a particular geographic region carried by any variety of RF signals, such as ultra-high frequency (UHF), very-high frequency (VHF), or any other suitable frequency bands. The broadcaster 110 may be configured to broadcast over-the-air content signals in one or more geographies, such as a variety of geographies with people of a variety of different political affiliations. The broadcaster 110 may further be configured to broadcast over-the-air content signals via one or more broadcast stations with one or more call letters. The broadcaster 110 when broadcasting the media content signal(s), may have ads embedded in the media content signal(s). The ads, in example embodiments, may be embedded in predetermined avails of the media content by the broadcaster 110 to generate a broadcast signal and then broadcast over the air by the broadcaster 110. In further example embodiments, the broadcaster 110, in addition to or instead of broadcasting its broadcast signal over the air, may be configured to provide the broadcast signal (e.g., with embedded ads) and/or the media content signals (e.g., without embedded ads) to the MSO 130. In some example embodiments, the broadcaster 110 may provide the broadcast signal and/or the media content signals via one or more of a hardwired communicative link to the MSO 130 or via a wireless (e.g., RF) communicative link to the MSO 130. In other example embodiments, the broadcaster 110 may not specifically transmit the broadcast signal to the MSO 130, but instead may allow the MSO 130 to receive the broadcast signal from the air and further manipulate the received broadcast signal. The broadcaster 110 may be or may be owned and/or controlled by any variety of organizations including private corporations, publicly-traded companies, partnerships, limited liability companies, for-profit corporations, non-profit corporations, federal, state, or local governments, individuals, combinations thereof, or the like. In some cases, the broadcaster 110 may have a broadcast footprint that spans a relatively limited geographic area, such as a particular city, portion of a city, or a collection of cities and/or towns.

In some other example embodiments, the content provider(s) and/or broadcaster(s) 110 may not be a broadcaster 110 or over-the-air transmitter of media content signals. In these cases, the content provider 110 may be a producer of the media content (e.g., movie or television studio) or a distributer of the media content. In these embodiments, the content provider 110 may be configured to provide the media content, either directly or indirectly, to the MSO 130 via any variety of suitable mechanisms including via direct satellite feed and/or coaxial cable.

The ad buyers 120 may be individuals or other entities, such as corporations, non-profit organizations, for-profit organizations, government organizations, public sector organizations, or any of the aforementioned entities located in this country or foreign countries that may be able to direct the purchase of ad assets and/or provide ads, or components thereof, via the ad buyer server(s) 240 to one or more of the compositing server(s) 260, ad campaign server(s) 250, or any other entity of environment 200. The ad buyer server(s) 240, therefore, may be configured, at least in part to receive, identify, and/or transmit ads and/or other content, or portions thereof.

Ad buyers 120 may further be able to interact with the MSO 130 via a user device. The ad buyer's user device may be any variety of user devices including, but not limited to tablet computing devices, electronic book (ebook) readers, netbook computers, notebook computers, laptop computers, desktop computers, server systems, personal digital assistants (PDA), smart phones, web-enabled televisions, video game consoles, set top boxes (STB), digital video recorder (DVR) systems, combinations thereof, or the like. The ad buyers 120 may be individuals or other entities, such as corporations, non-profit organizations, for-profit organizations, government organizations, public sector organizations, or any of the aforementioned entities located in this country or foreign countries. In example embodiments, one or more of the ad buyer 120 may be a political party and/or an affiliate or agent acting on behalf of a political party. For example, the ad buyer 120 may be the Republican Party, the Democratic Party, the Green Party, the Libertarian Party, the Tea Party, the Constitution Party, the Socialist Party, the Communist Party, combinations thereof, or the like, or agents or affiliates of the aforementioned political parties.

The zones 140 may be geographic locations within the distribution footprint of the MSO 130. In other words, the distribution geography of the MSO 130 may be divided into a plurality of zones 140, or portions of the full distribution geography of the MSO 130. In some example embodiments, the plurality of zones 140 may be within any suitable geographic boundaries, such as a particular city, a particular metropolitan region, a particular suburb, a particular town, a particular county, a particular group of counties, a particular state or provincial administrative region, a particular national region, a particular country, a particular group of countries, combinations thereof, or the like. In some example embodiments, the zones 140 may be non-overlapping. In other example embodiments, at least two or more of the zones 140 may be at least partially overlapping, or otherwise their spatial range may at least partially overlap.

Each of the zones 140 may include one or more households or businesses 142. These households or businesses 142 may include any variety of structures, such as single family homes, condominiums, townhouses, apartments, residences, commercial businesses, office buildings, multi-story buildings, mid-rise buildings, high-rise buildings, government facilities, schools, universities, colleges, not-for-profit campuses, for-profit campuses, combinations thereof, or the like. While the same number and/or type of households or businesses 142 are shown in each zone 140, it will be appreciated that the zones 140 may have any suitable number of households or businesses 140 and any suitable mix of types of households and businesses 142. Each of the zones 140, therefore, may have a different or same number of households or businesses. For example, one zone 140 may have 45 single family residences 142. Another example zone 140 may have a mixed-use condominium complex with 300 residential units 142 and 4 businesses. Yet another example zone 140 may include a town with 3000 residences and 100 businesses. It will be appreciated that the plurality of zones may have any suitable spatial granularity. In some cases, the zones 140 may be based on borders of towns or collection of towns, zip codes or portions of or a collection of zip codes, a particular head-end of the MSO 130, a particular content distribution node of the MSO 130, or the like. As an example, zones 140 may be demarcated with a granularity of a neighborhood or block level. As another example, zones 140 may have a spatial resolution of ZIP Code+2 digits (e.g., 12345-67XX, wherein a particular zone may span all locations with a zip code that starts with 12345-67). The ZIP Code+2 digit level may correspond to individual political districts and may, therefore, in example embodiments, be a level of spatial granularity that may be suited to target political ads to particular political races and/or campaigns.

In example embodiments, some or all of the households or businesses 142 may have one or more client devices 144 for receiving content, such as zone targeted signals, or zone signals, from the MSO 130. The client devices 144 in a particular zone 140 may receive the same zone signal and that zone signal, in example embodiments, may be different from another zone signal distributed to client devices 144 in another zone 140. In some cases, two or more zones 140 out of a plurality of zones 140 may receive the same zone signal. The client devices 144 may be any suitable device configured to receive content form the MSO 130 and configured to render the received content including, but not limited to tablet computing devices, electronic book (ebook) readers, netbook computers, notebook computers, laptop computers, desktop computers, server systems, personal digital assistants (PDA), smart phones, web-enabled televisions, video game consoles, set top boxes (STB), digital video recorder (DVR) systems, combinations thereof, or the like. The client devices 144, in example embodiments, may be configured to receive content or zone signals in any variety of suitable formats, media, and/or communicative links. The client devices 144 may be configured to receive zone signals via one or more networks associated with the MSO 130 that may include any one or a combination of different types of suitable communications networks, such as cable networks, the Internet, wireless networks, cellular networks, and other private and/or public networks. Furthermore the networks may include any variety of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof. In example embodiments, the client devices 144 may be configured to receive zone signals as quadrature amplitude modulation (QAM) channels, Internet Protocol (IP) media content, and/or streaming media content.

It will be appreciated that in some example embodiments, the client devices 144 within a particular zone 140 or even within a particular household or business 142 may be of different types. For example, a particular household 142 may have a STB 144 for receiving both QAM and IP signals and smart phone 144 and a laptop computer 144 for receiving streaming content. As another example, a particular neighborhood may be a single zone 140 and each household 142 in that neighborhood 140 may have different model(s) and/or type(s) of STBs 144 and/or DVRs 144 and, furthermore, each of the households 142 may further have a variety of other client devices 144, such as smart phones and tablet computers, for receiving media content, such as media content carried by a zone signal.

The client device(s) 144 may further be configured to provide viewing and/or interaction information to the MSO 130. This information may include information such as what media content (e.g., media content carried by a particular zone signal) was viewed by a particular household or business 142. Other information, such as any interactions that a viewer (e.g., consumer of media content) may have had with the media content that he/she had viewed, may also be provided by client device(s) to the MSO 130. These interactions may include, for example, any invocation of trick plays, rewinding, fast forwarding, pausing, or the like of the media content, as well as any interactions that a consumer of the media content may have had with the zone content, such as advertising embedded in the media content carried by the zone signal.

The MSO 130 may include a variety of elements, including one or more traffic and billing server(s) 160, an ad datastore 162, one or more ad server(s) 164, a content delivery network (CDN) 170, one or more datapull server(s) 180, a viewing metrics datastore 182. In some cases, the environment 100 may further include one or more ad recommendation server(s) 150. The ad recommendation server(s) 150, in some example embodiments, may be part of the MSO 130. In alternative example embodiments, the ad recommendation server(s) 150 may be a separate entity from the MSO 130.

The traffic and billing server(s) 160 may be configured to receive one or more ads from the ad buyers 120. These ads, in some example embodiments, may have identifying information associated with them, such as target demography, geography, and/or behavior of the content consumer. In other example embodiments, the ads may be received from the ad buyers 120 without any targeting information. In these cases, the traffic and billing server(s) and/or other elements of the MSO 130 may ascribe one or more targeting information (e.g., target demography, geography, and/or behavior) to the received ads. The received ads may be stored by the traffic and billing server(s) 160, such as in the ad datastore 162. In example embodiments, received ads may be stored by the traffic and billing server(s) 160 in association with their corresponding respective targeting information. For the purposes of this disclosure, demographical targets may include targets pertaining to number of people in a viewer's household, gender of the viewers, age of the viewers, race of the viewers, religion of the viewers, sexual orientation of the viewers, political views of the viewers, product or service preferences of viewers, combinations thereof, or the like. The geographic targets may pertain to particular regions, such as particular towns and/or suburbs of a metropolitan area, specific zones 140, particular area codes, or the like. The behavioral targets of the viewers may include a viewer or a group of viewers for whom the corresponding ad is to be targeted based at least in part on product or service purchase history, content viewing history, ad interaction history, or the like.

The traffic and billing server(s) may further be configured to receive one or more content from the content providers or broadcasters 110. In some example embodiments, the received content may be received via direct communicative links, such as wire, optical, and/or wireless communicative links between the MSO 130 and the content provider(s) or broadcaster(s) 110. In other example embodiments, the MSO 130 may be configured to receive media content from a broadcaster 110 by receiving a broadcast signal from the air, such as via one or more antenna(s) (not shown) configured receive the frequency, wavelength, power level, etc., of the broadcast signal. In some example embodiments, regardless of whether the media content is received directly or by receiving a broadcast signal, the traffic and billing server(s) 160, the CDN 170 or other entities of the MSO 130 may be configured to perform a variety of suitable processing on the received content signal, such as any combination of demodulation, modulation, filtering, enhancing, amplifying, decoding, encoding, decrypting, encrypting, digital rights management (DRM) adjudication, combinations thereof, or the like. In example embodiments, the traffic and billing server(s) 160 and/or other entities of the MSO 130 may be configured to provide payment (e.g., monetary payment, credits, payment in kind, or the like) to the content provider or broadcaster 110 providing the content or allowing the content to be captured from the air to the MSO 130 and/or to any variety of other entities associated with the content received by the MSO 130.

In some example embodiments, the received content, such as a content carried by a broadcast signal that is otherwise broadcast by a broadcaster 110, may have ads embedded therein. In these cases, the traffic and billing server(s) 160 may be configured to identify the ads that are pre-embedded in the received content and may be further configured to direct removing and replacing one or more of the pre-embedded ads in the received content with one or more of the ads for targeting that is received from the ad buyers 120. In some cases, the content may be received from the content provider(s) or broadcaster(s) 110 with an ad map that identifies where ads are located in the content received by the MSO 130. The ad map of a particular received content may provide temporal bookmarks where the pre-embedded ads are placed and may be utilized by the traffic and billing server(s) 160, the ad server(s) 164, or other entities of the MSO 130 to identify where one or more ads received from the ad buyers 120 may be placed within the received content. It will be appreciated that in some cases, the pre-embedded ads in the media content may be targeted for a geographic region that is different from where the content is to be distributed as zone signals to two or more zones 140.

In other example embodiments, the received content, such as a content carried by a broadcast signal that is otherwise broadcast by a broadcaster 110, may not have ads embedded therein. In these cases, the traffic and billing server(s) 160 may be configured to identify ad avails within the received content where one or more of the ads for targeting that is received from the ad buyers 120 may be inserted. In some cases, the content may be received from the content provider(s) or broadcaster(s) 110 with an ad map that identifies temporal locations of ad avails in the content received by the MSO 130. It will be appreciated that in some cases, the ad map may identify bookmarks within the received content where the content provider 110 or other party may consider to be acceptable locations to insert ads. In some example embodiments, the traffic and billing server(s) 160 or other entities of the MSO 130 may be configured to insert ads into the received media content at any location within (e.g., including pre-roll, interstitial, and post-roll) the received media content without conforming to any pre-determined map of ad avails therein.

The traffic and billing server(s) 160 may be configured to direct the generation of two or more zone signals based at least in part on a particular received media content. The zone signal for a particular zone 140 may be generated by taking a received media content and inserting one or more ads into the ad avails or insertion spots associated with that media content. Another zone signal may be generated by inserting a different set of one or more ads into the ad avails or insertion spots associated with the media content. In this way, any number of different zone signals may be generated. Each zone signal may be generated for distribution in a targeted zone 140, in accordance with example embodiments of the disclosure. In some example embodiments, the traffic and billing server(s) 160 may be configured to direct the generation of the zone signals based at least in part on information, such as a target zone and/or target demographics (e.g., majority political affiliation in a target zone), that may be received along with ads received from the ad buyers 120. In certain example embodiments, the traffic and billing server(s) 160 may further be configured to direct the replacement and/or removal of pre-embedded ads from the media content received from the content providers or broadcasters. The traffic and billing server(s) 160 may still further be configured to provide directions and/or instructions to create the various zone signals to the one or more ad server(s) 164. In example embodiments, there may be a separate ad server 164 for each zone 140 of a particular content distribution region and the traffic and billing server(s) 160 may be configured to provide appropriate instructions to each of the ad server(s) 164 to generate their respective zone signal for distribution to their respective zones 140.

In some example embodiments, the traffic and billing server(s) 160 and/or other entities of the MSO 130 may be configured to receive zone signals directly from the content provider or broadcaster 110. In other words, the content provider or broadcaster 110 may provide two or more zone signals associated with a particular media content, such as a television show, where different sets of ads associated with each of the two or more zone signals are already embedded within the content of those received zone signals. In these embodiment, the traffic and billing server(s) 160 may be configured to appropriately direct the routing of the received zone signals from the content provider or broadcaster 110 to its respective corresponding zone 140.

The traffic and billing server(s) 160 may further be configured to direct, upon generation, the transmission of the zone signal(s) to the content viewers, households or businesses 142, and client devices 144 of corresponding respective zones 140. The traffic and billing server(s) 160 may be configured to provide directions and/or instructions to the CDN 170, in example embodiments, or specific entities within the CDN (e.g., video server(s), edge server(s), etc.) for the distribution of the appropriate zone signal to its corresponding zone 140.

The traffic and billing server(s) 160 may still further be configured to bill the ad buyers 120 for the placement and/or targeting of their ads. In some cases, the traffic and billing server(s) may still further be configured to bill the ad buyers 120, the content providers or broadcasters 110, and/or agents thereof for ad viewing metrics and/or other analytics that may be provided for the targeted ads. Therefore, the traffic and billing server(s) 160 may enable the monetization of the ad zone-based targeting and/or data/analytics services provided herein by the MSO 130 and/or associated parties. In one sense, the traffic and billing server(s) provide coordination services to the MSO 130 for the implementation of the systems and methods described herein for generating and distributing targeted zone signals to corresponding zones 140.

The ad server(s) 164 may include one or more computer processor(s) and memory and may be configured to receive messages from the traffic and billing server(s) 160 carrying instructions for generating suitable zone signals for each of the zones of the content distribution region. In example embodiments, a particular ad server 164 may generate zone signals for one particular zone 140. In alternate example embodiments, a particular ad server 164 may generate zone signals for more than one zone 140. The ad server 164 may be configured to receive direction regarding which ads to insert and/or replace into a particular content, such as from the traffic and billing server(s) 160. Responsive to the received direction, the ad server 164 may be configured to identify and retrieve, such as from the ad datastore 162, the ads and media content to be combined to generate the zone signal(s).

The CDN 170 may include a variety of elements, including a variety of computing and networking elements, for the distribution of content, such as the zone signals to their corresponding zones 140 and client devices 144 therein. One or more elements, such as a video server of the CDN 170, may be configured to receive instructions and/or direction from the traffic and billing server(s) 160 for the distribution of zone signals to their corresponding respective zones 140.

The data pull server(s) 180 may be configured to request or ping the client devices 144 at the homes or businesses 142 at a particular zone 140 to receive data about viewing of content, such as a particular zone signal that were distributed to that zone 140. In some example embodiments, this viewing information may be requested from and received from managed client devices 144, such as a STB 144. In other example embodiments, this viewing information may be requested from and received from both managed and unmanaged client devices 144. In response to pinging the client devices 144, the data pull server(s) 180 may receive an indication of what content may have been viewed on the client device 144. From the information about content rendered by the client device 144, it may be determined what ads (e.g., ads carried by the zone signal delivered to the client device during the times the client device 144 was rendering the associated media content) were viewed. Furthermore, the number of viewers in a particular household or business 142 may be estimated based at least in part on additional information about that household or business 142, such as the number of people in a household 142. In this way of polling client devices 144, the data pull server(s) 180 may be configured to determine which ads were viewed with what frequency for each of the zones 140. This determination may be made by aggregating the data and/or information received from all the client devices 144 from a particular zone 140 for a particular zone signal carrying a particular media content. The data pull server(s) 180, therefore, in example embodiments, may be configured to provide aggregate viewing metrics by zone, ad, media content, and/or time. In example embodiments, the data pull server(s) 180 may be configured to ping the client devices 144 at predetermined times, such as when the CDN 170 load and bandwidth requirements are relatively low. For example, the data pull process may be performed in the middle of the night, when there may be relatively fewer consumers of content of the MSO 130, so that valuable network bandwidth is not diverted from the delivery of content and/or providing Internet or telecommunications services.

In example embodiments, the data pull server(s) 180 may be configured to provide viewing metrics and/or analytics directly to the ad buyers 120 and/or agents thereof. For example, the data pull server(s) 180 may be configured to provide information about the number of viewers of a particular political ad in each zone 140 of distribution of the MSO 130. Therefore, the distribution of zoned content to each of the zones 140, enables the data pull server(s) 180 to obtain, process, and provide zone based analytical data that may be used by the recipient of the analytical data for purposes of determining the effectiveness of ads provided in each of the zones 140. In example embodiments, the analytics data generated may be indicative of the effectiveness of political ads in particular political districts or zones. In other example embodiments, this viewership metrics and analytics may be provided indirectly via one or more other entities, such as the ad recommendation server(s) 150. In this case, the ad recommendation server(s) 150 may be configured to perform additional analysis and or generate additional analytics for a variety of ads, zones, viewing, interaction, viewer demographics, and may be further configured to provide additional information, such as information received from third party sources. For example, the ad recommendation server(s) 150 may be configured to provide statistics of viewership of certain types of ads, such as ads associated with a particular political campaign, over a period of time. As another example, the ad recommendation server(s) 150 may receive third party information, such as other types of viewership estimates and/or demographical data of the target content consumers, such as form Nielson® or Experian®, and provide that third party data along with the compiled analytics from polling the client devices 144. In yet another example, third party data may be used to further tune and/or make additional, more accurate, and/or more precise estimates of analytics provided by the ad recommendation server(s) 150. In further example embodiments, the ad recommendation server(s) 150 may be configured to provide recommendations of ads to provide and zone-based targeting of those ads to the ad buyers 120 or agents thereof. It will be appreciated that in some cases, the ad recommendation server(s) 150 may be owned and/or controlled by the MSO 130. In other cases, the ad recommendation server(s) 150 may be owned and/or controlled by a third party entity.

It will be appreciated that in certain example embodiments, the systems and methods as described herein may provide the ability to a broadcaster 110 that would otherwise broadcast a content signal to target their content signal by cooperating with an MSO 130 to split and targeted their content signals to particular location zones 140 within the content distribution region. Additionally, the targeting of ads by splitting a content signal into multiple zone directed signals may also enable the collection of analytics by the MSO 130, such as estimates of the number of viewers of a particular ad. This information can be provided to one or more of the broadcaster 110, ad buyer 120, and/or third party entities and data aggregators. As a non-limiting example, a particular broadcast signal carrying a particular television show may be received by an MSO 130 and may be split into two zone signals. The first zone signal may carry political ads directed to the Republican Party and the second zone signal may carry political ads directed to the Democratic Party. The first zone signal may be distributed to a number of zones 140 in a metropolitan area that are known to have or likely to have more people that vote for the Republican Party than the Democratic Party. Similarly, the second zone signal may be distributed to a different set of zones 140 in the metropolitan area that are known to have or likely to have more people that vote for the Democratic Party than the Republican Party. In this case, the ad buyers (e.g., Republican and Democratic political campaigns) may be better able to target their ads to achieve their goals (e.g., maximize viewership, solidify support, maximize votes, etc.). The providing of analytics may provide better targeting of ads by zone. Political ad effectiveness may be ascertained by either the MSO 130 and/or elements 140, 150 therein, or the recipient of the ad viewing analytics for determining ad effectiveness and for modifying ad delivery strategy based thereon.

The services as described herein may be monetized by one or more of the MSO 130, the content provider 110, the ad buyer, and/or third party entities. The agreements therebetween may, in example embodiments, be established by contractual agreements. In some example embodiments, agreements may be based at least in part on performance metrics (e.g., payment per view, or payment if a threshold level of views of and ad are achieved, etc.). It will also be appreciated that the methods and systems as described herein may enable differential pricing for delivery of ads to various zones 140. Coming back to the political example, zones 140 that have predominantly Republican or predominantly Democratic voters may command a relatively lower ad delivery pricing than areas with a lot of undecided voters, where delivery of political ads may provide a relatively greater benefit for either a Republican campaign or a Democratic campaign.

Figure 2:
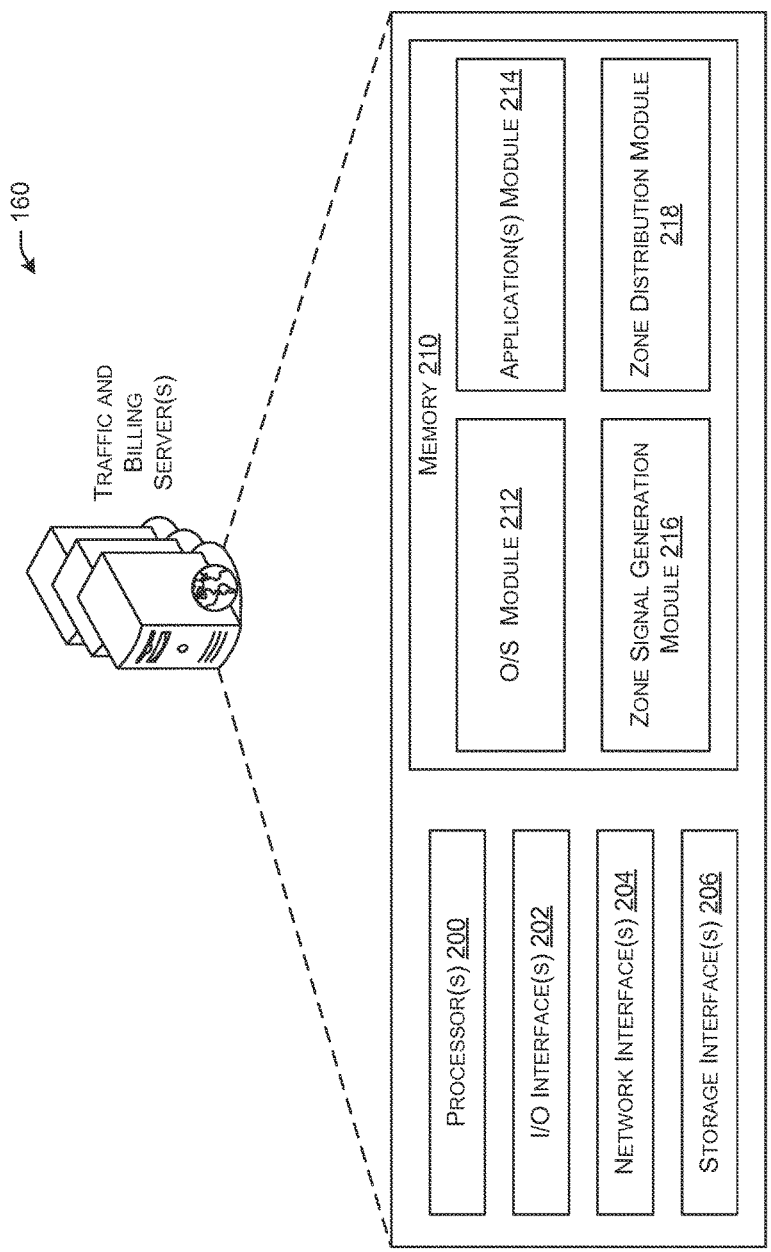
FIG. 2 is a simplified block diagram illustrating example architecture of a traffic and billing server of the environment of FIG. 1 for generating a zone content signal based at least in part on a received content signal, in accordance with certain example embodiments of the disclosure.

The architecture of the traffic and billing server(s) 160 may be better understood with reference to FIG. 2. FIG. 2 is a simplified block diagram illustrating example architecture of a traffic and billing server 160 of the environment 100 of FIG. 1 for generating a zone content signal based at least in part on a received content signal, in accordance with certain example embodiments of the disclosure.

The traffic and billing server 160 may include one or more processor(s) 200, one or more input/output (I/O) interfaces 202, one or more network interfaces 204, one or more storage interface(s) 206, and one or more memories 310.

The one or more I/O device interfaces 202 may enable the use of one or more (I/O) device(s) or user interface(s), such as a keyboard and/or mouse. An administrator may be able to administer the systems and methods disclosed herein by interacting with traffic and billing server 160 via the I/O device interfaces 202. The network interfaces(s) 204 may allow the traffic and billing server 160 to communicate via one or more network(s) and/or via other suitable communicative channels. In example embodiments, the network interfaces 304 may enable the traffic and billing server 160 to communicate with one or more other entities of the MSO 130, the ad buyers 120, and/or the content provider or broadcasters 110. The storage interfaces 306 may enable the traffic and billing server 160 to communicate and/or use one or more storage devices, such as, for example the ad datastore 162.

The processor(s) 200 of the traffic and billing server 160 may be implemented as appropriate in hardware, software, firmware, or combinations thereof. Software or firmware implementations of the processor(s) 200 may include computer-executable or machine-executable instructions written in any suitable programming language to perform the various functions described. Hardware implementations of the processor(s) 200 may be configured to execute computer-executable or machine-executable instructions to perform the various functions described. The one or more processor(s) 200 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The traffic and billing server 160 may also include a chipset (not shown) for controlling communications between one or more processor(s) 200 and one or more of the other components of the traffic and billing server 160. The processor(s) 200 may also include one or more application specific integrated circuits (ASICs) or application specific standard products (ASSPs) for handling specific data processing functions or tasks.

The memory 210 may include one or more volatile and/or non-volatile memory devices including, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The memory 210 may store program instructions that are loadable and executable on the processor(s) 200, as well as data generated or received during the execution of these programs. Turning to the contents of the memory 210 in more detail, the memory 210 may include one or more operating systems (0/S) module 212, an applications module 214, a zone signal generation module 216, and a zone distribution module 218. Each of the modules and/or software may provide functionality for the traffic and billing server 160, when executed by the processor(s) 200. The modules and/or the software may or may not correspond to physical locations and/or addresses in memory 210. In other words, the contents of each of the modules 212, 214, 216, 218 may not be segregated from each other and may, in fact, be stored in at least partially interleaved positions on the memory 210.

The O/S module 212 may have one or more operating systems stored thereon. The processor(s) 200 may be configured to access and execute one or more operating systems stored in the (0/S) module 212 to operate the system functions of the traffic and billing server 160. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 214 may contain instructions and/or applications thereon that may be executed by the processor(s) 200 to provide one or more functionality associated with the generation and distribution of zone signals. These instructions and/or applications may, in certain aspects, interact with the (O/S) module 212 and/or other modules of the traffic and billing server 160. The applications module 214 may have instructions, software, and/or code stored thereon that may be launched and/or executed by the processor(s) 200 to execute one or more applications and functionality associated therewith. These applications may include, but are not limited to, functionality such as web browsing, business, communications, graphics, word processing, publishing, spreadsheets, databases, gaming, education, entertainment, media, project planning, engineering, drawing, or combinations thereof.

The zone signal generation module 214 may have instructions stored thereon that, when executed by the processor(s) 200, enable the traffic and billing server 160, to perform various functions related to related to directing the generation of the targeted zone signals that are to be provided to client devices 144 in their respective targeted zones 140. The processor(s) 200 may be configured to receive one or more ads from the ad buyers 120. These ads, in some example embodiments, may have identifying information associated with them, such as target demography, geography, and/or behavior of the content consumer. In other example embodiments, the ads may be received from the ad buyers 120 without any targeting information. In these cases, the processor(s) 200 and/or other elements of the MSO 130 may ascribe one or more targeting information (e.g., target demography, geography, and/or behavior) to the received ads. The received ads may be stored by the processor(s) 200, such as in the ad datastore 162. In example embodiments, received ads may be stored by the processor(s) 200 in association with their corresponding respective targeting information. For the purposes of this disclosure, demographical targets may include targets pertaining to number of people in a viewer's household, gender of the viewers, age of the viewers, race of the viewers, religion of the viewers, sexual orientation of the viewers, political views of the viewers, product or service preferences of viewers, combinations thereof, or the like. The geographic targets may pertain to particular regions, such as particular towns and/or suburbs of a metropolitan area, specific zones 140, particular area codes, or the like. The behavioral targets of the viewers may include a viewer or a group of viewers for whom the corresponding ad is to be targeted based at least in part on product or service purchase history, content viewing history, ad interaction history, or the like.

The processor(s)(s) 200, by executing instructions stored in the zone signal generation module 214, may further be configured to receive one or more content from the content providers or broadcasters 110. In some example embodiments, the received content may be received via direct communicative links, such as wire, optical, and/or wireless communicative links between the MSO 130 and the content provider(s) or broadcaster(s) 110. In other example embodiments, the MSO 130 may be configured to receive media content from a broadcaster 110 by receiving a broadcast signal from the air, such as via one or more antenna(s) (not shown) configured receive the frequency, wavelength, power level, etc., of the broadcast signal. In some example embodiments, regardless of whether the media content is received directly or by receiving a broadcast signal, the traffic and billing server(s) 160, the CDN 170 or other entities of the MSO 130 may be configured to perform a variety of suitable processing on the received content signal, such as any combination of demodulation, modulation, filtering, enhancing, amplifying, decoding, encoding, decrypting, encrypting, digital rights management (DRM) adjudication, combinations thereof, or the like.

The processor(s)(s) 200, by executing instructions stored in the zone signal generation module 214, may yet further be configured to direct the generation of two or more zone signals based at least in part on a particular received media content. The zone signal for a particular zone 140 may be generated by taking a received media content and inserting one or more ads into the ad avails or insertion spots associated with that media content. Another zone signal may be generated by inserting a different set of one or more ads into the ad avails or insertion spots associated with the media content. In this way, any number of different zone signals may be generated. In example embodiments, factors other than zone targeting may be considered in generating zone signals. For example, in example embodiments, particular ads may be prioritized in generating zone signals so that target metrics, such ad metrics stipulated contractually between an ad buyer 120 and the MSO 130, may be achieved. Furthermore, in other example embodiments, the processor(s) 200 may be configured to prioritize particular ads in generating zone signals in light of scheduling considerations of particular ads. Each zone signal may be generated for distribution in a targeted zone 140, in accordance with example embodiments of the disclosure. In some example embodiments, the processor(s) 200 may be configured to direct the generation of the zone signals based at least in part on information, such as a target zone and/or target demographics (e.g., majority political affiliation in a target zone), that may be received along with ads received from the ad buyers 120. In certain example embodiments, the processor(s) 200 may further be configured to direct the replacement and/or removal of pre-embedded ads from the media content received from the content providers or broadcasters. The processor(s) 200 may still further be configured to provide directions and/or instructions to create the various zone signals to the one or more ad server(s) 164. In example embodiments, there may be a separate ad server 164 for each zone 140 of a particular content distribution region and the traffic and billing server(s) 160 may be configured to provide appropriate instructions to each of the ad server(s) 164 to generate their respective zone signal for distribution to their respective zones 140.

In some example embodiments, the processor(s)(s) 200, by executing instructions stored in the zone signal generation module 214, may still further be configured to receive zone signals directly from the content provider or broadcaster 110. In other words, the content provider or broadcaster 110 may provide two or more zone signals associated with a particular media content, such as a television show, where different sets of ads associated with each of the two or more zone signals are already embedded within the content of those received zone signals. In these embodiment, the processor(s) 200 may be configured to appropriately direct the routing of the received zone signals from the content provider or broadcaster 110 to its respective corresponding zone 140.

The zone distribution module 216 may have instructions stored thereon that, when executed by the processor(s) 200, enable the traffic and billing server 160, to perform various functions related to distributing zone signals to their corresponding zones 140. The processor(s)(s) 200 may further be configured to direct, upon generation, the transmission of the zone signal(s) to the content viewers, households or businesses 142, and client devices 144 of corresponding respective zones 140. The processor(s) 200 may be configured to provide directions and/or instructions to the CDN 170, in example embodiments, or specific entities within the CDN (e.g., video server(s), edge server(s), etc.) for the distribution of the appropriate zone signal to its corresponding zone 140.

It will be appreciated that there may be overlap in the functionality of the instructions stored in the operating systems (O/S) module 212, the applications module 214, the zone signal generation module 216, and the zone distribution module 218. In fact, the functions of the aforementioned modules 212, 214, 216, 218 may interact and cooperate seamlessly under the framework of the traffic and billing server 160. Indeed, each of the functions described for any of the modules 212, 214, 216, 218 may be stored in any module 212, 214, 216, 218 in accordance with certain embodiments of the disclosure. Further, in certain embodiments, there may be one single module that includes the instructions, programs, and/or applications described within the O/S module 212, the applications module 214, the zone signal generation module 216, and the zone distribution module 218.

Figure 3:
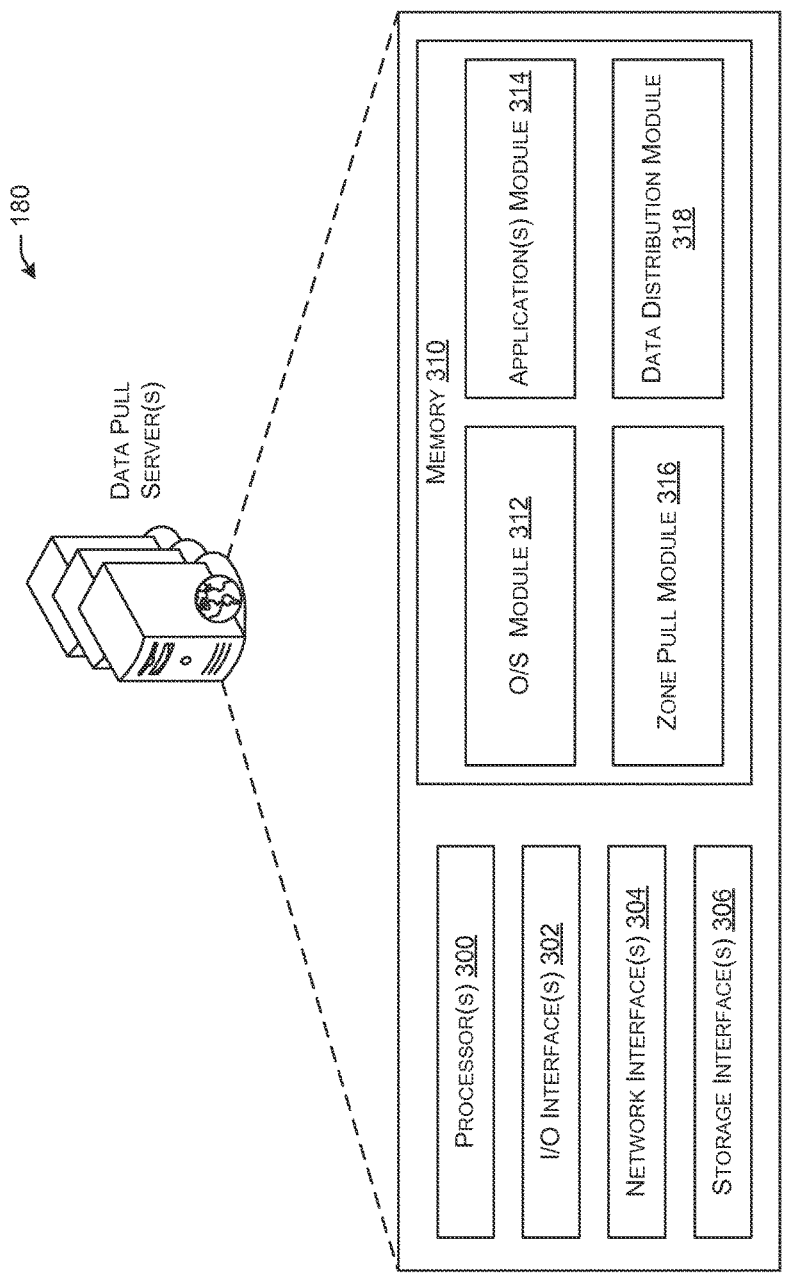
FIG. 3 is a simplified block diagram illustrating an example architecture of a data pull server of the environment of FIG. 1 for receiving analytics associated with the distribution of a variety of split content signals, in accordance with certain example embodiments of the disclosure.

FIG. 3 is a simplified block diagram illustrating an example architecture of a data pull server 180 of the environment 100 of FIG. 1 for receiving analytics associated with the distribution of a variety of split zone signals, in accordance with certain example embodiments of the disclosure.

The data pull server 180 may include one or more processor(s) 300, one or more input/output (I/O) interfaces 302, one or more network interfaces 304, one or more storage interface(s) 306, and one or more memories 310. The description of these elements may be substantially similar to the description of the one or more processor(s) 200, one or more input/output (I/O) interfaces 202, one or more network interfaces 204, one or more storage interface(s) 206, and one or more memories 210 of the traffic and billing server(s) 160 as described in FIG. 2 and, therefore, in the interest of brevity, the descriptions will not be repeated here.

The memory 310 may store program instructions that are loadable and executable on the processor(s) 300, as well as data generated or received during the execution of these programs. Turning to the contents of the memory 310 in more detail, the memory 310 may include one or more operating systems (O/S) module 312, an applications module 314, a zone pull module 316, and an a data distribution module 318. Each of the modules and/or software may provide functionality for the data pull server 180, when executed by the processor(s) 300. The modules and/or the software may or may not correspond to physical locations and/or addresses in memory 310. In other words, the contents of each of the modules 312, 314, 316, 318 may not be segregated from each other and may, in fact be stored in at least partially interleaved positions on the memory 310.

The description of the O/S module 312 and the application(s) module 314 may be substantially similar to the description of the O/S module 212 and the application(s) module 214 of the traffic and billing server 160 of FIG. 2 and, in the interest of brevity, will not be repeated here.

The zone pull module 316 may have instructions stored thereon that, when executed by the processor(s) 300, enable the data pull server 180 to perform various functions related to requesting, receiving, and manipulating data from one or more zones 140 and the client devices 144 therein. The processor(s) 300 may be configured to request or ping the client devices 144 at the homes or businesses 142 at particular zones 140 to receive data about viewing of content, such as a particular zone signal that were distributed to that zone 140 at some period of prior time (e.g., the previous day or the previous week). In some example embodiments, the processor(s) 300 may be configured to request this viewing information from and receive this viewing information from managed client devices 144, such as a STB 144. In other example embodiments, the processor(s) 300 may be configured to request this viewing information from and receive this viewing information from both managed and unmanaged client devices 144. Unmanaged client devices 144, in example embodiments, may be client devices 144 that receive content via non-QAM-based channels, such as via the Internet, such as streaming media. In example embodiments, the processor(s) 300 may be configured to generate the request for viewing information as one or more data packets that are transmitted to the client devices 144 being polled via any suitable mechanism and/or communicative link, such as via the CDN 170. In example embodiments, the processor(s) may be configured to route the request to particular client devices 144 to request a listing of all content received and/or rendered by the client device 144 over the time period for which the viewing information is desired. The client devices 144 may have this information stored in its computer memory and may be configured to provide the same responsive to the request from the processor(s) 300.

In response to pinging the client devices 144, the processor(s) 300 may receive an indication of what content may have been viewed on the client device 144. From the information about content rendered by the client device 144, it may be determined what ads (e.g., ads carried by the zone signal delivered to the client device during the times the client device 144 was rendering the associated media content) were viewed. The processor(s) 300 may be configured to ascertain this information from a log or record of ads carried by various zone signals over the period for which viewing information has been requested. Furthermore, in example embodiments, the number of viewers in a particular household or business 142 may be estimated by the processor(s) 300 based at least in part on additional information about that household or business 142, such as the number of people in a household 142. In this way of polling client devices 144, the processor(s) 300 may be configured to determine which ads were viewed with what frequency for each of the zones 140. This determination may be made by aggregating the data and/or information received from all the client devices 144 from a particular zone 140 for a particular zone signal carrying a particular media content. The processor(s) 300 of the data pull server(s) 180, therefore, in example embodiments, may be configured to provide aggregate viewing metrics by zone, ad, media content, and/or time. In example embodiments, the processor(s) 300 may be configured to ping the client devices 144 at predetermined times, such as when the CDN 170 load and bandwidth requirements are relatively low. For example, the data pull process may be performed in the middle of the night, when there may be relatively fewer consumers of content of the MSO 130, so that valuable network bandwidth is not diverted from the delivery of content and/or providing Internet or telecommunications services. In example embodiments, the data pull servers may store the analytics, such as in the viewing metrics datastore 182 until the data is to be provided to another entity.

The data distribution module 318 may have instructions stored therein that may be executed by the processor(s) 300 to provide functionality associated with distributing analytic data and/or metrics associated with viewing of ads provided to various zones 140 and carried by two or more zone signals. In example embodiments, processor(s) 300 may be configured to provide viewing metrics and/or analytics directly to the ad buyers 120, content providers or broadcasters 110, and/or agents thereof. For example, the processor(s)(s) 180 may be configured to provide information about the number of viewers of a particular political ad in each zone 140 of distribution of the MSO 130. In other example embodiments, this viewership metrics and analytics may be provided by the processor(s) 300 indirectly, such as via one or more other entities, such as the ad recommendation server(s) 150. In this case, the combination of the data pull server(s) 180 and the ad recommendation server(s) 150 may be configured to perform additional analysis and or generate additional analytics for a variety of ads, zones, viewing, interaction, viewer demographics, and may be further configured to provide additional information, such as information received from third party sources.

It will be appreciated that there may be overlap in the functionality of the instructions stored in the operating systems (O/S) module 312, the applications module 314, the zone pull module 316, and the data distribution module 318. In fact, the functions of the aforementioned modules 312, 314, 316, 318 may interact and cooperate seamlessly under the framework of the data pull server 180. Indeed, each of the functions described for any of the modules 312, 314, 316, 318 may be stored in any module 312, 314, 316, 318 in accordance with certain embodiments of the disclosure. Further, in certain embodiments, there may be one single module that includes the instructions, programs, and/or applications described within the operating systems (O/S) module 312, the applications module 314, the zone pull module 316, and the data distribution module 318.

Figure 4:
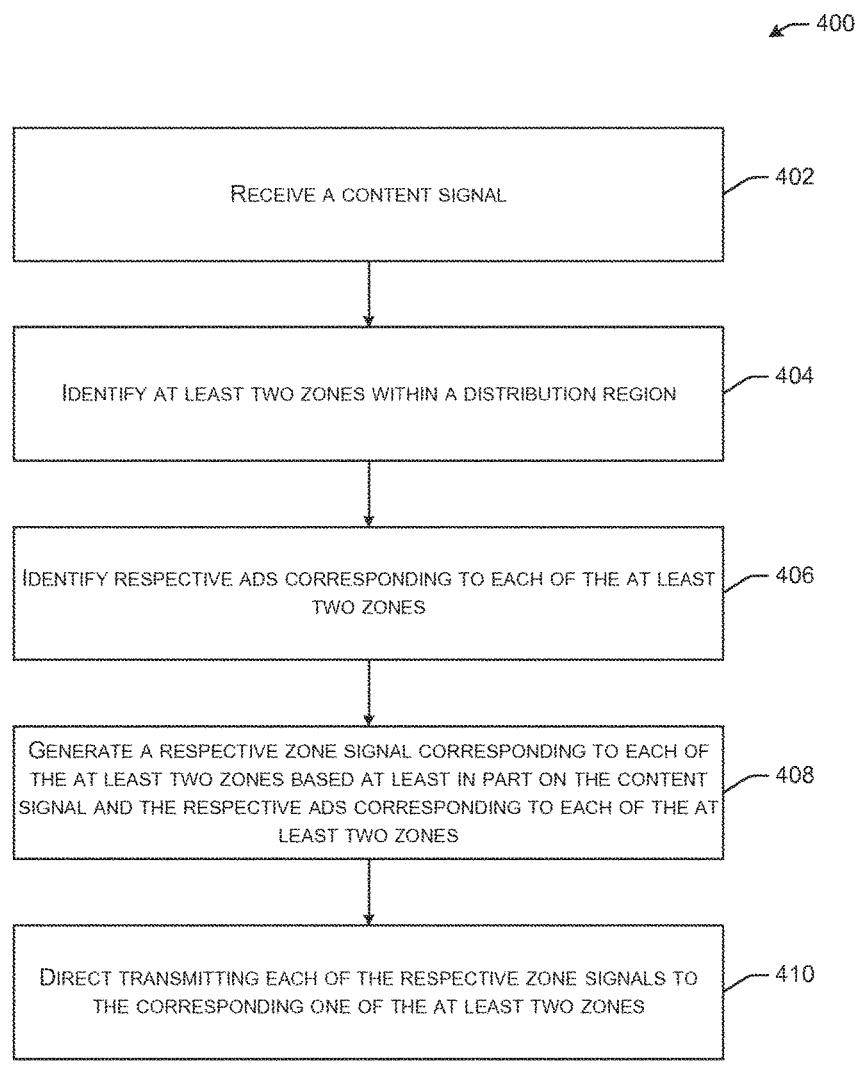
FIG. 4 is a flow diagram illustrating an example method for generating and directing the transmission of zone signals to corresponding zones within a geographic region, in accordance with certain example embodiments of the disclosure.

FIG. 4 is a flow diagram illustrating an example method 400 for generating and directing the transmission of zone signals to corresponding zones within a geographic region, in accordance with certain example embodiments of the disclosure. This method 400 may be performed by the traffic and billing server(s) 160 and the processor(s) 200 thereon, in example embodiments, in cooperation of the CDN 170, the ad server(s) 164, and/or other entities of the MSO 130.

At block 402, a content signal may be received. The content signal may carry a media content and may be received in any suitable format, protocol, and/or transmission medium. In example embodiments, the content signal may be provided directly from the content provider or broadcaster 110 via a direct communicative link between the content provider or broadcaster 110 and the MSO 130. In some example embodiments, the received content signal may be one that when not distributed by the MSO 130 may otherwise be broadcast by a broadcaster 110. In some cases, these broadcast signals may be received from the on-air broadcast. In some example embodiments, the received content signal may have pre-embedded ads in them. In other example embodiments, the received content signal may be devoid of any pre-embedded ads.

At block 404, at least two zones within a distribution region may be identified. These identified zones 140 may be pre-determined, such as by an operator and/or any other suitable entity. The zones 140 may be geographic locations within the distribution footprint of the MSO 130. In other words, the distribution geography of the MSO 130 may be divided into a plurality of zones 140, or portions of the full distribution geography of the MSO 130. In some example embodiments, the plurality of zones 140 may be within any suitable geographic boundaries, such as a particular city, a particular metropolitan region, a particular suburb, a particular town, a particular county, a particular group of counties, a particular state or provincial administrative region, a particular national region, a particular country, a particular group of countries, combinations thereof, or the like. In some example embodiments, the zones 140 may be non-overlapping. In other example embodiments, at least two or more of the zones 140 may be at least partially overlapping, or otherwise their spatial range may at least partially overlap. In some example embodiments, the demarcation of zones may change with time.

At block 406, respective ads corresponding to each of the at least two zones may be identified. These one or more ads may be received from the ad buyers 120. These ads, in some example embodiments, may have identifying information associated with them, such as target demography, geography, and/or behavior of the content consumer. The target demography, geography, and/or behavior of the content consumer, associated with ads along with demographical, geographical, and/or behavioral profiles of content consumers in each of the zones 140 may be utilized to associate particular ads to corresponding zone(s) 140. In other example embodiments, the ads may be received from the ad buyers 120 without any targeting information. In these cases, the traffic and billing server(s) and/or other elements of the MSO 130 may ascribe one or more targeting information (e.g., target demography, geography, and/or behavior) to the received ads. In these embodiments, ads for the at least two zones may be identified based at least in part on the ascribed targeting information of an inventory of ads, such as ads stored in the ad datastore 162. For the purposes of this disclosure, demographical targets may include targets pertaining to number of people in a viewer's household, gender of the viewers, age of the viewers, race of the viewers, religion of the viewers, sexual orientation of the viewers, political views of the viewers, product or service preferences of viewers, combinations thereof, or the like. The geographic targets may pertain to particular regions, such as particular towns and/or suburbs of a metropolitan area, specific zones 140, particular area codes, or the like. The behavioral targets of the viewers may include a viewer or a group of viewers for whom the corresponding ad is to be targeted based at least in part on product or service purchase history, content viewing history, ad interaction history, or the like.

At block 408, a respective zone signal corresponding to each of the at least two zones may be generated based at least in part on the content signal and the respective ads corresponding to each of the at least two zones. This process may be directed by the traffic and billing server(s) 160 and performed by the ad server(s) 164, the CDN 170, or other entities of the MSO 130. The zone signal for a particular zone 140 may be generated by taking the received content signal and inserting the respective ads corresponding to each zone, as identified by the processes of block 406, into the ad avails or insertion spots associated with that content signal. In this way, any number of different zone signals may be generated for distribution to the various zones 140. Each zone signal may be generated for distribution in one or more targeted zone(s) 140. In other words, some zones 140 may receive the same zone signal as other zones. In certain example embodiments, pre-embedded ads may be replaced and/or removed of from the media content received from the content providers or broadcasters 110 prior to inserting the appropriate ads identified in the processes of block 406 to generate the zone signals. In example embodiments, The processor(s) 200 may still further be configured to provide directions and/or instructions to create the various zone signals to the one or more ad server(s) 164. In example embodiments, there may be a separate ad server 164 for each zone 140 of a particular content distribution region and the traffic and billing server(s) 160 may be configured to provide appropriate instructions to each of the ad server(s) 164 to generate their respective zone signal for distribution to their respective zones 140.

At block 410, transmitting each of the respective zone signals to the corresponding one of the at least two zones may be directed. Directions and/or instructions may be provided to the CDN 170, in example embodiments, or specific entities within the CDN (e.g., video server(s), edge server(s), etc.) for the distribution of the appropriate zone signal to its corresponding zone 140. The zone signals, in some example embodiments, may be transmitted to managed client devices 144 via any suitable medium and protocol, such as a QAM channel over coaxial cable or HFC. In other example embodiments, the zone signals may be streamed to managed or unmanaged client devices 144.

It should be noted, that the method 400 may be modified in various ways in accordance with certain embodiments of the disclosure. For example, one or more operations of method 400 may be eliminated or executed out of order in other embodiments of the disclosure. Additionally, other operations may be added to method 400 in accordance with other embodiments of the disclosure.

Figure 5:
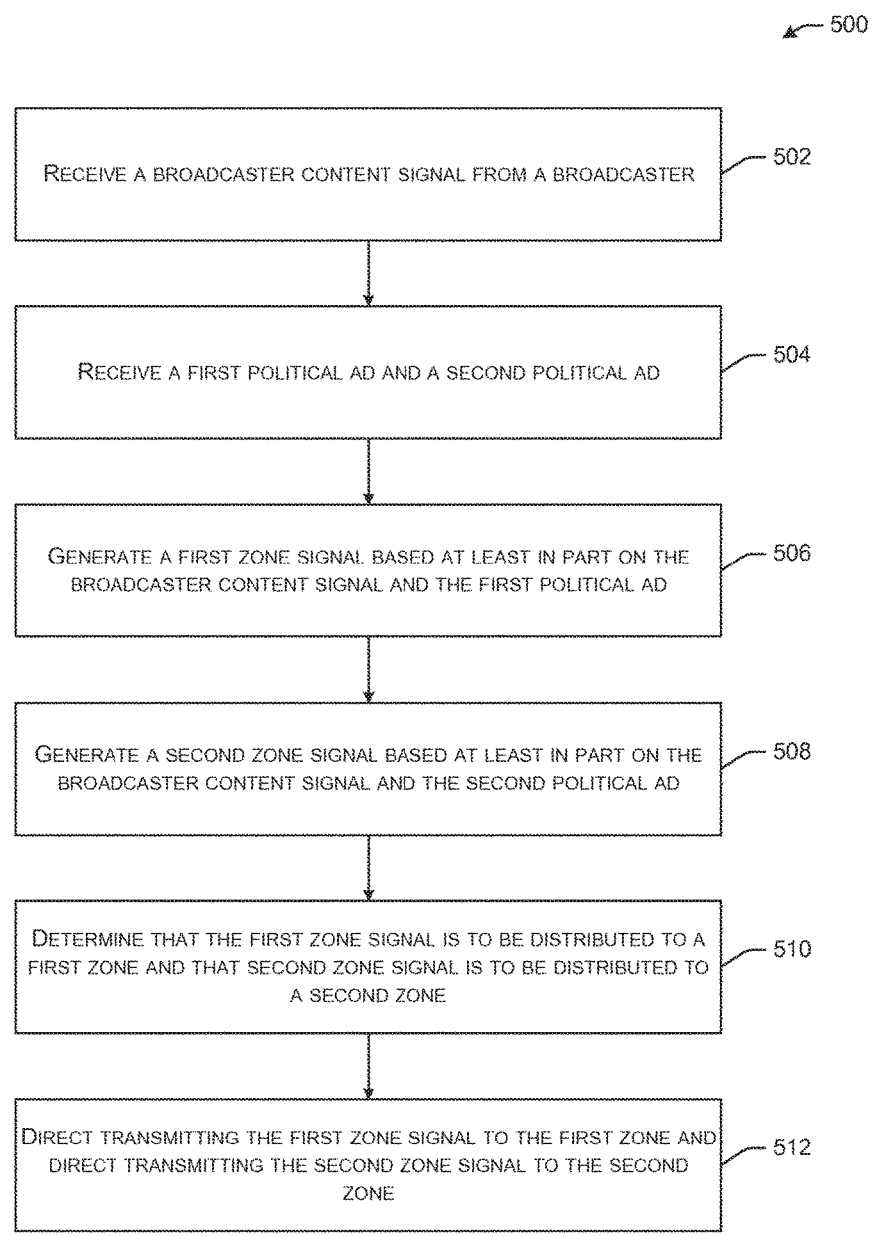
FIG. 5 is a flow diagram illustrating an example method for receiving a content signal from a broadcaster, generating zone signals based at least in part on one or more political ads, and directing the transmission of the zone signals, in accordance with certain example embodiments of the disclosure.

FIG. 5 is a flow diagram illustrating an example method 500 for receiving a content signal from a broadcaster, generating zone signals based at least in part on one or more political ads, and directing the transmission of the zone signals, in accordance with certain example embodiments of the disclosure. In certain example embodiments, the method 500 may be performed by the MSO system 130 and/or the traffic and billing server(s) 160 and the processor(s) 200 thereon. The traffic and billing server(s) 160, in performing the method 500, may interact with a variety of entities, such as the CDN 170 during one or more processes of method 500.

At block 502, a broadcaster content signal may be received from a broadcaster. These processes may be similar to the processes of block 402 of FIG. 4. In this case, the content may be a broadcaster signal provided by a broadcaster 110, either directly or captured from the broadcaster's broadcast. At block 504, a first political ad and a second political ad may be received. In example embodiments, the first political ad and the second political ad may be associated with two different political campaigns. In some example embodiments, the first and second political campaigns may be competing and/or opposing campaigns. The first political ad and the second political ad may be received from corresponding respective ad buyers 120 and stored in the ad datastore 162.

At block 506, a first zone signal may be generated based at least in part on the broadcaster content signal and the first political ad. The first zone signal may be generated by taking the received broadcaster content signal and inserting the first political ad and potentially other ads into the avails or slots associated with the broadcaster content. In some example embodiments, if the broadcaster content signals have pre-embedded ad(s), at least one of those pre-embedded ad(s) may be replaced with the first political ad.

At block 508, a second zone signal may be generated based at least in part on the broadcaster content signal and the second political ad. The second zone signal may be generated by taking the received broadcaster content signal and inserting the second political ad and potentially other ads into the avails or slots associated with the broadcaster content. In some example embodiments, if the broadcaster content signals have pre-embedded ad(s), at least one of those pre-embedded ad(s) may be replaced with the second political ad.

At block 510, it may be determined that the first zone signal is to be distributed to a first zone and that second zone signal is to be distributed to a second zone. This determination may be based at least in part on the target demographics associated with the first political ad and/or second political ad. In some example embodiments, the political ads may be targeted to zones 140 with people that are predominantly of the same political affiliation as the political ad. These affiliations may include any variety of political party affiliations, political candidate affiliations, and or political outlook, such as liberal, conservative, apathetic, fiscally conservative, fiscally liberal, socially conservative, socially liberal, combinations thereof, or the like. In other example embodiments, the political ads may be targeted to zones 140 with people that are predominantly of a dissimilar political affiliation as the political ad. In yet other example embodiments, both the first and second political ads may be targeted to zones 140 with people that are middle-of-the road, undecided, or independent. At block 512, transmitting the first zone signal to the first zone and transmitting the second zone signal to the second zone may be directed.

It should be noted, that the method 500 may be modified in various ways in accordance with certain embodiments of the disclosure. For example, one or more operations of method 500 may be eliminated or executed out of order in other embodiments of the disclosure. Additionally, other operations may be added to method 500 in accordance with other embodiments of the disclosure.

Figure 6:
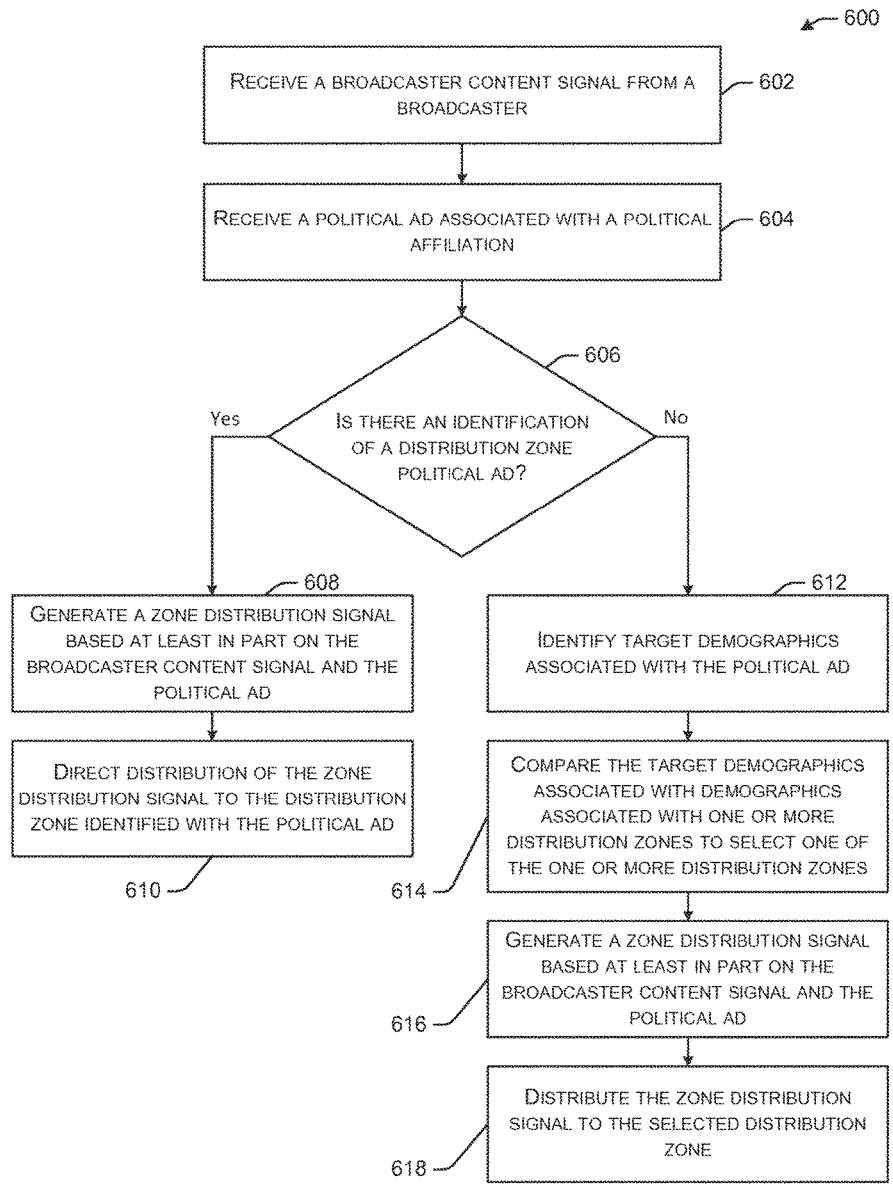
FIG. 6 is a flow diagram illustrating another example method for receiving a content signal from a broadcaster, generating zone signals based at least in part on one or more political ads, and directing the transmission of the zone signals, in accordance with certain example embodiments of the disclosure.

FIG. 6 is a flow diagram illustrating another example method 600 for receiving a content signal from a broadcaster, generating zone signals based at least in part on one or more political ads, and directing the transmission of the zone signals, in accordance with example embodiments of the disclosure. In certain example embodiments, the method 600 may be performed by the MSO system 130 and/or the traffic and billing server(s) 160 and the processor(s) 200 thereon. The ad server(s) 160, in performing the method 600, may interact with a variety of entities, such as the CDN 170 during one or more processes of method 600.

At block 602, a broadcaster content signal may be received from a broadcaster. At block 604, a political ad associated with a particular political affiliation may be received. The political affiliation may be a particular party, a particular candidate, or a particular outlook. The political outlook may include, but are not limited to, liberal, conservative, apathetic, fiscally conservative, fiscally liberal, socially conservative, socially liberal, combinations thereof, or the like. Party affiliation may include, but are not limited to, the Republican Party, the Democratic Party, the Green Party, the Libertarian Party, the Tea Party, the Constitution Party, the Socialist Party, the Communist Party, combinations thereof, or the like, or agents or affiliates (e.g., political action committees) of the aforementioned political parties.

At block 606, it may be determined if there is an identification of a distribution zone for the political ad. This determination may be made based on information provided, such as by the ad buyer 120, pertaining to targets of the political ad. If it is determined, at block 606, that there is a distribution zone identified for the political ad, then at block 608, a zone distribution signal may be generated based at least in part on the broadcaster content signal and the political ad. At block 610, distribution of the zone signal to the distribution zone identified with the political ad may be directed.

If it was determined, at block 606, that there is no distribution zone identified for the political ad, then at block 612, target demographics associated with the political ad may be identified. In some example embodiments, these target demographics and/or profile may be determined based at least in part on an identity of the ad buyer, any labels associated with the political ad, and/or an identity of the candidate associated with the political ad. At block 614, the target demographics may be compared with demographics associated with one or more distribution zones to select one of the one or more distribution zones. In example embodiments, it will be appreciated that more than one distribution zone may be selected. At block 616, a zone distribution signal may be generated based at least in part on the broadcaster content signal and the political ad. At block 618, the zone distribution signal may be distributed to the selected distribution zone.

It should be noted, that the method 600 may be modified in various ways in accordance with certain embodiments of the disclosure. For example, one or more operations of method 600 may be eliminated or executed out of order in other embodiments of the disclosure. Additionally, other operations may be added to method 600 in accordance with other embodiments of the disclosure.

Figure 7:
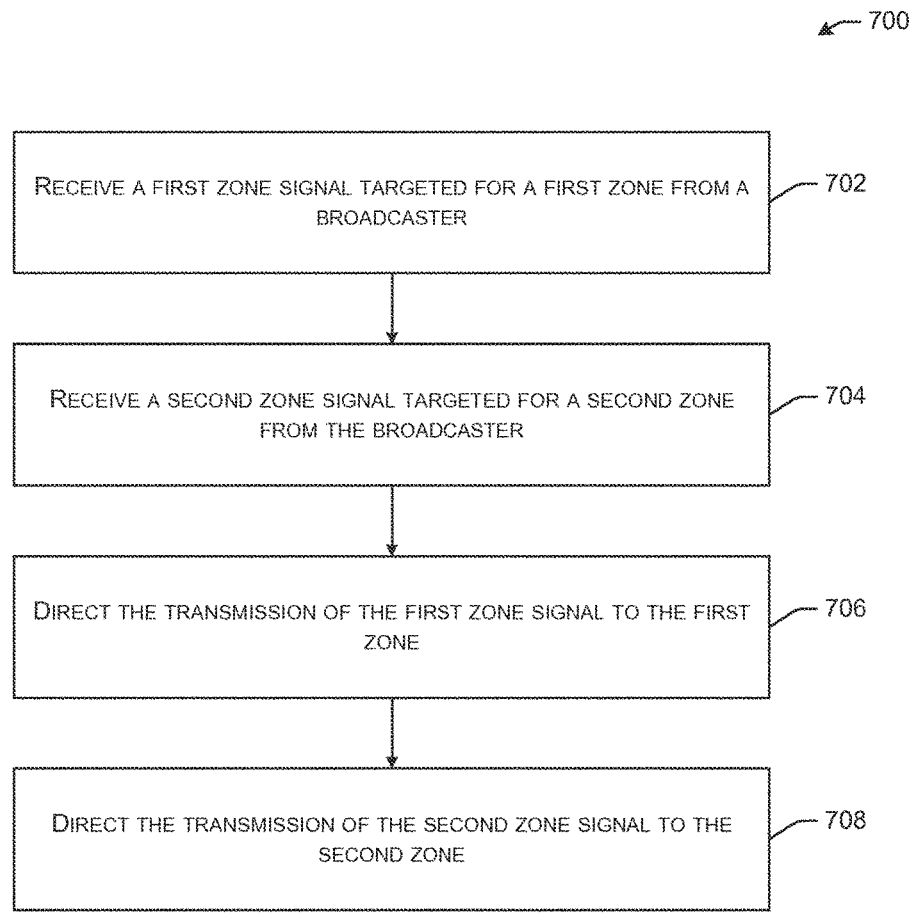
FIG. 7 is a flow diagram illustrating an example method for receiving zone signals and distributing the zone signals to corresponding zones, in accordance with certain example embodiments of the disclosure.

FIG. 7 is a flow diagram illustrating an example method 700 for receiving zone signals and distributing the zone signals to corresponding zones, in accordance with example embodiments of the disclosure. In certain example embodiments, the method 600 may be performed by the MSO system 130, the traffic and billing server(s) 160, and/or the CDN 170.

At block 702, a first zone signal targeted for a first zone may be received from a broadcaster. At block 704, a second zone signal targeted for a second zone may be received from the broadcaster. In this method 700, the zone signals received from the broadcaster 110 may already have ads embedded therein that are to be distributed by the MSO 130 to their target zones. In example embodiments, the media content of the first zone signal and the second zone signal may be the same or similar, except for one or more ads embedded therein. At block 706, the transmission of the first zone signal to the first zone may be directed. At block 708, the transmission of the second zone signal to the second zone may be directed.

It should be noted, that the method 700 may be modified in various ways in accordance with certain embodiments of the disclosure. For example, one or more operations of method 700 may be eliminated or executed out of order in other embodiments of the disclosure. Additionally, other operations may be added to method 700 in accordance with other embodiments of the disclosure.

Figure 8:
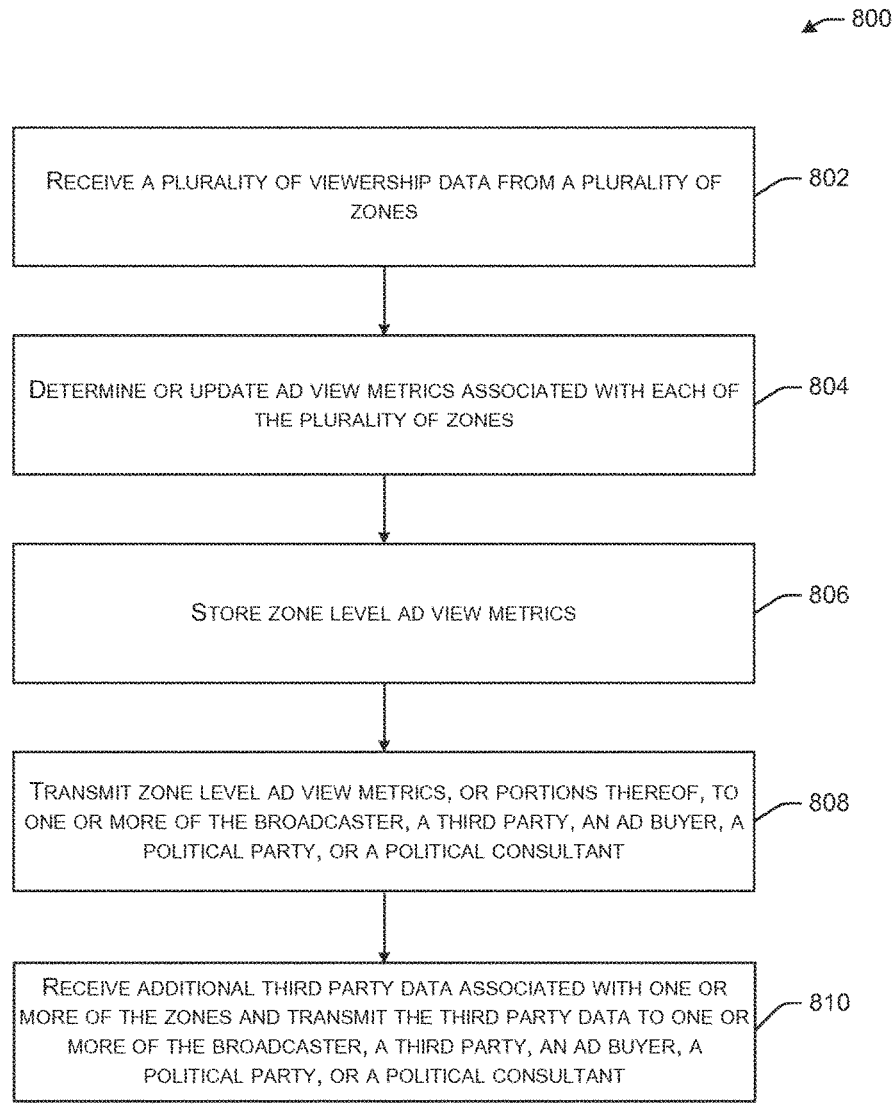
FIG. 8 is a flow diagram illustrating an example method for receiving and compiling analytical data associated with each of the zone signals, in accordance with certain example embodiments of the disclosure.

FIG. 8 is a flow diagram illustrating an example method 800 for receiving and compiling analytical data associated with each of the zone signals, in accordance with example embodiments of the disclosure. In certain example embodiments, the method 800 may be performed by the data pull server(s) 180. The data pull server(s) 180, in performing the method 800, may interact with a variety of entities, such as the MSO 130, during one or more processes of method 800. At block 802, a plurality of viewership data may be received from a plurality of distribution zones. This viewership data may be received responsive to a request for the same by the data pull server(s) 180. In some example embodiments, the viewing information may be received from managed client devices 144, such as a STB 144. In other example embodiments, this viewing information may request from and receive from both managed and unmanaged client devices 144. Unmanaged client devices 144, in example embodiments, may be client devices 144 that receive content via non-QAM-based channels, such as via the Internet, such as streaming media. In example embodiments, the request to particular client devices 144 to request a listing of all content received and/or rendered by the client device 144 over the time period for which the viewing information is desired may be transmitted. The client devices 144 may have this information stored in its computer memory and may be configured to provide the same responsive to the request from the processor(s) 300.

At block 804, ad view metrics associated with each of the plurality of distribution zones may be determined or updated. may receive an indication of what content may have been viewed on the client device 144. From the information about content rendered by the client device 144, it may be determined what ads (e.g., ads carried by the zone signal delivered to the client device during the times the client device 144 was rendering the associated media content) were viewed.

This information may be ascertained from a log or record of ads carried by various zone signals over the period for which viewing information has been requested. Furthermore, in example embodiments, the number of viewers in a particular household or business 142 may be estimated based at least in part on additional information about that household or business 142, such as the number of people in a household 142. In this way of polling client devices 144 which ads were viewed with what frequency for each of the zones 140 may be determined. This determination may be made by aggregating the data and/or information received from all the client devices 144 from a particular zone 140 for a particular zone signal carrying a particular media content. In example embodiments, aggregate viewing metrics by zone, ad, media content, and/or time may be aggregated.

At block 806, distribution zone level ad view metrics may be stored. In example embodiments, the data pull servers may store the analytics, such as in the viewing metrics datastore 182 until the data is to be provided to another entity. At block 808, distribution zone level ad view metrics, or portions thereof, may be transmitted to one or more of the broadcaster, a third party, an ad buyer, a political party, or a political consultant. For example, information about the number of viewers of a particular political ad in each zone 140 of distribution of the MSO 130 may be provided. At block 810, optionally, additional third party information associated with one or more of the zones may be received and transmitted to one or more of the broadcaster a third party, an ad buyer, a political party, or a political consultant.

It should be noted, that the method 800 may be modified in various ways in accordance with certain embodiments of the disclosure. For example, one or more operations of method 800 may be eliminated or executed out of order in other embodiments of the disclosure. Additionally, other operations may be added to method 800 in accordance with other embodiments of the disclosure.

It will be appreciated that, in example embodiments, the systems and methods as described herein may be employed to direct broadcast signals carrying ads to particular zones, such as with a geographical granularity of ZIP+2. Therefore, ads, such as political ads, may be targeted to particular political districts, as well as collections and/or portions of political districts. Furthermore, analytics, such as viewership from each of these zones corresponding to political districts may be ascertained and provided to interested parties. These interested parties may use the analytics information to modify and/or tune the further delivery of political to one or more of the zones. In this way, a broadcaster may be enabled to target their ad delivery by cooperating with a MSO. Also, the broadcaster, ad buyers, or other related parties may be able to receive analytics with a relatively high spatial granularity compared to what an over-the-air broadcaster may be configured to provide.

Embodiments described herein may be implemented using hardware, software, and/or firmware, for example, to perform the methods and/or operations described herein. Certain embodiments described herein may be provided as one or more tangible machine-readable media storing machine-executable instructions that, if executed by a machine, cause the machine to perform the methods and/or operations described herein. The tangible machine-readable media may include, but is not limited to, any type of disk including floppy disks, optical disks, compact disk read-only memories (CD-ROMs), compact disk rewritable (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware. Additionally, in certain embodiments, a special-purpose computer or a particular machine may be formed in order to identify actuated input elements and process the identifications.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method, comprising:
   identifying, by one or more servers comprising one or more processor(s), a content distribution region and a plurality of zones within the content distribution region, including a first zone and a second zone;
   identifying, by the one or more servers, a media content comprising at least one pre-embedded advertisement;
   receiving, by the one or more servers, a first advertisement and a second advertisement from a datastore;
   determining, by the one or more servers, that the first advertisement is associated with the first zone and the second advertisement is associated with the second zone;
   determining, by the one or more servers, that the at least one pre-embedded advertisement is targeted for distribution in a third zone within the content distribution region, wherein the third zone is associated with a third geographic region that at least partially overlaps a first geographic region associated with the first zone and wherein the first geographic region at least partially overlaps a second geographic region associated with the second zone;
   directing, by the one or more servers and based at least in part on determining that the first advertisement is associated with the first zone and the second advertisement is associated with the second zone, generation of a first zone signal by combining the first advertisement with the media content and a second zone signal by combining the second advertisement with the media content, the combining the first advertisement with the media content comprising replacing the at least one pre-embedded advertisement targeted for distribution in the third zone with the first advertisement, wherein directing the generation of the first zone signal comprises:
      identifying, by the one or more servers, one or more temporal bookmarks corresponding to an advertisement avail within an ad map, where the temporal bookmarks provide a placement of the pre-embedded advertisement within the media content;
      identifying one or more viewer characteristics associated with the first zone;
      identifying one or more viewer characteristics associated with the third zone;
      determining a difference between the one or more viewer characteristics associated with the first zone and the one or more viewer characteristics associated with the third zone;
      embedding, by the one or more servers, the first advertisement independent of the second advertisement at the advertisement avail in the media content for distribution to the first zone signal, the embedding comprising replacing the pre-embedded advertisement with the first advertisement based at least in part on the difference;
      generating the first zone signal based at least in part on replacing the pre-embedded advertisement with the first advertisement; and
      embedding, by the one or more servers, the second advertisement independent of the first advertisement at the advertisement avail in the media content for distribution to the second zone signal; and
   directing, by the one or more servers, distribution of the first zone signal to the first zone and the second zone signal to the second zone.

2. The method of claim 1, wherein identifying the plurality of zones within the content distribution region is based at least in part on respective information about a political affiliation of consumers of the media content within at least the first zone and the second zone of the plurality of zones.

3. The method of claim 1, wherein identifying the media content comprises receiving, by the one or more servers, the media content from a broadcaster.

4. The method of claim 3, wherein receiving the media content from the broadcaster comprises receiving, via one or more antennas, a wireless broadcast signal that is broadcast by the broadcaster.

5. The method of claim 1, wherein the first advertisement is affiliated with a first political party and the second advertisement is affiliated with a second political party.

6. The method of claim 5, wherein determining that the first advertisement is associated with the first zone comprises determining that the first political party is to be promoted to consumers of the media content within the first zone based at least in part on information about a political affiliation of consumers of the media content within the first zone.

7. The method of claim 6, wherein determining that the first political party is to be promoted to consumers of the media content within the first zone is further based at least in part on information about a target political affiliation of consumers of the media content received from an ad buyer.

8. The method of claim 1, further comprising:
   requesting, by the one or more servers, content rendering information from one or more client devices associated with the first zone;
   receiving, by the one or more servers and responsive to the request for content rendering information from the one or more client devices associated with the first zone, content rendering information from the one or more client devices associated with the first zone;
   determining, by the one or more servers and based at least in part on the received content rendering information, a first distribution zone advertisement viewing metric; and
   transmitting, by the one or more servers, the first distribution zone advertisement viewing metric.

9. The method of claim 8, further comprising:
requesting, by the one or more servers, content rendering information from one or more client devices associated with the second zone;
receiving, by the one or more servers and responsive to the request for content rendering information from the one or more client devices associated with the second zone, content rendering information from the one or more client devices associated with the second zone;
determining, by the one or more servers and based at least in part on the received content rendering information, a second distribution zone advertisement viewing metric; and
transmitting, by the one or more servers, the second distribution zone advertisement viewing metric.

10. A system, comprising:
at least one memory for storing computer-executable instructions; and
at least one processor in communication with the at least one memory, wherein the at least one processor is configured to execute the computer-executable instructions perform a method comprising:
identifying, by one or more servers comprising one or more processor(s), a content distribution region and a plurality of zones within the content distribution region, including a first zone and a second zone;
identifying a media content in a broadcast signal comprising at least one pre-embedded advertisement;
receiving a first advertisement and a second advertisement from a datastore;
determining that the first advertisement is associated with the first zone and the second advertisement is associated with the second zone;
determining that the at least one pre-embedded advertisement is targeted for distribution in a third zone within the content distribution region, wherein the third zone is associated with a third geographic region that at least partially overlaps a first geographic region associated with the first zone and wherein the first geographic region at least partially overlaps a second geographic region associated with the second zone;
directing, based at least in part on determining that the first advertisement is associated with the first zone and the second advertisement is associated with the second zone, generation of a first zone signal by combining the first advertisement with the media content and a second zone signal by combining the second advertisement with the media content, the combining the first advertisement with the media content comprising replacing the at least one pre-embedded advertisement targeted for distribution in the third zone with the first advertisement, wherein directing the generation of the first zone signal comprises:
identifying one or more temporal bookmarks corresponding to an advertisement avail within an ad map, where the temporal bookmarks provide a placement of the pre-embedded advertisement within the media content;
identifying one or more viewer characteristics associated with the first zone:
identifying one or more viewer characteristics associated with the third zone;
determining a difference between the one or more viewer characteristics associated with the first zone and the one or more viewer characteristics associated with the third zone;
embedding the first advertisement independent of the second advertisement at the advertisement avail in the media content for distribution to the first zone signal, the embedding comprising replacing the pre-embedded advertisement with the first advertisement based at least in part on the difference;
generating the first zone signal based at least in part on replacing the pre-embedded advertisement with the first advertisement; and
embedding the second advertisement independent of the first advertisement at the advertisement avail in the media content for distribution to the second zone signal; and
directing distribution of the first zone signal to the first zone and the second zone signal to the second zone.

11. The system of claim 10, wherein identifying the plurality of zones within the content distribution region is based at least in part on respective information about a political affiliation of consumers of the media content within at least the first zone and the second zone of the plurality of zones.

12. The system of claim 10, wherein identifying the media content comprises receiving the media content from a broadcaster.

13. The system of claim 12, wherein receiving the media content from the broadcaster comprises receiving a wireless broadcast signal that is broadcast by the broadcaster via one or more antennas or a direct broadcast signal via a direct communicative link with the broadcaster.

14. The system of claim 10, wherein the first advertisement is affiliated with a first political party and the second advertisement is affiliated with a second political party.

15. The system of claim 14, wherein determining that the first advertisement is associated with the first zone comprises determining that the first political party is to be promoted to consumers of the media content within the first zone based at least in part on information about a political affiliation of consumers of the media content within the first zone.

16. The system of claim 15, wherein determining that the first political party is to be promoted to consumers of the media content within the first zone is further based at least in part on information about a target political affiliation of consumers of the media content received from an ad buyer.

17. The system of claim 10, wherein the method further comprises:
requesting content rendering information from one or more client devices associated with the first zone;
receiving, responsive to the request for content rendering information from the one or more client devices associated with the first zone, content rendering information from the one or more client devices associated with the first zone;
determining, based at least in part on the received content rendering information, a first distribution zone advertisement viewing metric; and
transmitting the first distribution zone advertisement viewing metric.

18. The system of claim 17, wherein the method further comprises:
requesting content rendering information from one or more client devices associated with the second zone;
receiving, responsive to the request for content rendering information from the one or more client devices associated with the second zone, content rendering information from the one or more client devices associated with the second zone;

determining, based at least in part on the received content rendering information, a second distribution zone advertisement viewing metric; and transmitting, by the one or more servers, the second distribution zone advertisement viewing metric.

\* \* \* \* \*